United States Patent
Avital et al.

(10) Patent No.: US 10,397,112 B2
(45) Date of Patent: *Aug. 27, 2019

(54) INTRA-PLATFORM NETWORKING

(71) Applicant: Intel Corporation, Santa Clara, CA (US)

(72) Inventors: Shlomo Avital, Jerusalem (IL); Avishay Sharaga, Bet Nehemya (IL)

(73) Assignee: Intel Corporation, Santa Clara, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/383,848

(22) Filed: Dec. 19, 2016

(65) Prior Publication Data

US 2017/0331738 A1 Nov. 16, 2017

Related U.S. Application Data

(63) Continuation of application No. 13/997,449, filed as application No. PCT/US2013/032174 on Mar. 15, 2013, now Pat. No. 9,537,767.

(51) Int. Cl.
*G06F 15/16* (2006.01)
*H04L 12/741* (2013.01)
(Continued)

(52) U.S. Cl.
CPC ............ *H04L 45/745* (2013.01); *H04L 45/24* (2013.01); *H04L 61/1511* (2013.01);
(Continued)

(58) Field of Classification Search
USPC ....... 709/217, 219, 220, 245, 203, 206, 223, 709/224, 226, 228, 230, 232, 238;
(Continued)

(56) References Cited

U.S. PATENT DOCUMENTS

| 5,608,720 A | 3/1997 | Biegel |
|---|---|---|
| 6,411,506 B1 | 6/2002 | Hipp et al. |
| | (Continued) | |

FOREIGN PATENT DOCUMENTS

| CN | 1345145 A | 4/2002 |
|---|---|---|
| CN | 1479499 A | 3/2004 |
| | (Continued) | |

OTHER PUBLICATIONS

Office Action for Chinese Patent Application No. 201380073039.X, dated Nov. 10, 2017, 4 pages.
(Continued)

*Primary Examiner* — Quang N Nguyen
(74) *Attorney, Agent, or Firm* — Barnes & Thornburg LLP

(57) ABSTRACT

Technologies for communicating with local components of a computing device include intercepting a name resolution request from a host application, resolving a hostname included in the name resolution request to obtain a network address assigned to a target destination of the network packet, and transmitting the network address to the host application in response to the name resolution request. Such technologies may also include receiving the network packet from the host application destined for the network address, determining whether the target destination of the network packet includes a local component of the computing device based on the network address, and transmitting the network packet to the local component of the computing device via a platform network in response to the network packet being destined for the local component of the computing device.

28 Claims, 4 Drawing Sheets

(51) Int. Cl.
*H04L 29/12* (2006.01)
*H04L 29/08* (2006.01)
*H04L 12/707* (2013.01)
*H04L 12/743* (2013.01)

(52) U.S. Cl.
CPC ...... *H04L 67/1002* (2013.01); *H04L 45/7453* (2013.01); *H04L 61/2015* (2013.01); *H04L 61/2023* (2013.01); *H04L 61/2514* (2013.01)

(58) Field of Classification Search
USPC .......................................................... 713/168
See application file for complete search history.

(56) References Cited

U.S. PATENT DOCUMENTS

| | | | |
|---|---|---|---|
| 7,047,313 | B1 | 5/2006 | Broerman |
| 2005/0210139 | A1 | 9/2005 | Hightower et al. |
| 2006/0069750 | A1* | 3/2006 | Momtchilov ........... H04L 67/08 709/219 |
| 2007/0211714 | A1 | 9/2007 | Metke et al. |
| 2009/0059936 | A1 | 3/2009 | Van De Poel et al. |
| 2009/0210519 | A1* | 8/2009 | Zill ......................... H04L 12/12 709/220 |
| 2009/0219936 | A1 | 9/2009 | Tripathi et al. |
| 2012/0096261 | A1* | 4/2012 | Ko ...................... H04L 63/0236 713/168 |
| 2012/0215882 | A1* | 8/2012 | Goto ................... H04L 12/2812 709/217 |
| 2014/0310428 | A1* | 10/2014 | Avital ................... H04L 45/745 709/245 |

FOREIGN PATENT DOCUMENTS

| | | |
|---|---|---|
| CN | 1620044 A | 5/2005 |
| CN | 1788460 A | 6/2006 |
| CN | 101325530 A | 12/2008 |
| CN | 101335700 A | 12/2008 |

OTHER PUBLICATIONS

Third Office Action for Chinese Patent Application No. 201380073039.X dated Mar. 30, 2018, 3 pages.
Chinese Office Action for Patent Application No. 201380073039.X, dated Apr. 25, 2017, 21 pages.
"Pseudo-top-level domain," Wikipedia, The Free Encyclopedia, retrieved from: <http://en.wikipedia.org/w/index.php?title=Pseudo-topleve_domain&oldid=5406783533>, edited Feb. 26, 2013, 1 page.
"Fully qualified domain," Wikipedia, The Free Encyclopedia, retrieved from: <http://en.wikipedia.org/w/index.php?title=Fully_gualified_domain_name&oldid=539693004>, edited Feb. 22, 2013, 2 pages.
Microsoft Corporation, "About the Device Access API (Windows)," retrieved from: <http:msdn.microsoft.com/en-us/library/windows/desktop/hh404235>, Nov. 29, 2012, 2 pages.
International Search Report and Written Opinion received for PCT Application No. PCT/US2013/032174, dated Dec. 19, 2013, 9 pages.
European Search Report for Patent Application No. 13877952.5-1505/2972908, dated Sep. 23, 2016, 8 pages.
"Down to the TLP: How PCI express devices talk (Part II)," xillybus.com, Jan. 21, 2013, 6 pages.
"Down to the TLP: How PCI express devices talk (Part II)," xillybus.com, Jan. 21, 2013, 3 pages.
Shanks, Eric, "WMware Network Traffic Routing," Mar. 16, 2012, 8 pages.

* cited by examiner

INTRA-PLATFORM NETWORKING

CROSS-REFERENCE TO RELATED APPLICATION

The present application is a continuation application of U.S. application Ser. No. 13/997,449, entitled "INTRA-PLATFORM NETWORKING," now U.S. Pat. No. 9,537,767, which was filed on Jun. 24, 2013, and which is a national stage entry under 35 U.S.C. § 371(b) of International Application No. PCT/US2013/032174, which was filed on Mar. 15, 2013.

BACKGROUND

A computing device generally includes an operating system, which manages the various hardware and software resources of the computing device. Operating systems typically utilize one or more device drivers to control a particular hardware device of the computing device. Device drivers are software programs that act as an interface between the operating system of the computing device. Most operating systems natively expose hardware devices providing baseline capabilities of the computing device (e.g., Universal Serial Bus, wireless networking, system memory access, etc.) to applications executed by the operating system via one or more application programming interfaces (APIs) or defined interfaces, which may communicate with one or more device drivers. However, to expose hardware devices providing new and/or additional capabilities to the computing device, many operating systems require that the hardware vendor provide a proprietary device driver, which must be registered with the operating system during boot.

An increasing trend among operating system providers is to limit the number and/or type of non-native operating system capabilities allowed to be registered. For example, an operating system vendor may only permit a platform vendor (e.g., an original equipment manufacturer) to choose and register a fixed number of device drivers with the operating system. One reason for doing this is to commoditize the functionality of the computing device hardware. Security concerns may be another reason for limiting the number of non-native operating systems capabilities allowed to be registered. Whatever the reason may be, this practice threatens the ability of hardware vendors to continue developing new hardware devices and/or functionality. Additionally, such practice empowers operating system vendors and/or original equipment manufacturers to unilaterally decide which hardware devices and/or functionalities are available on a platform without input from hardware vendors.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
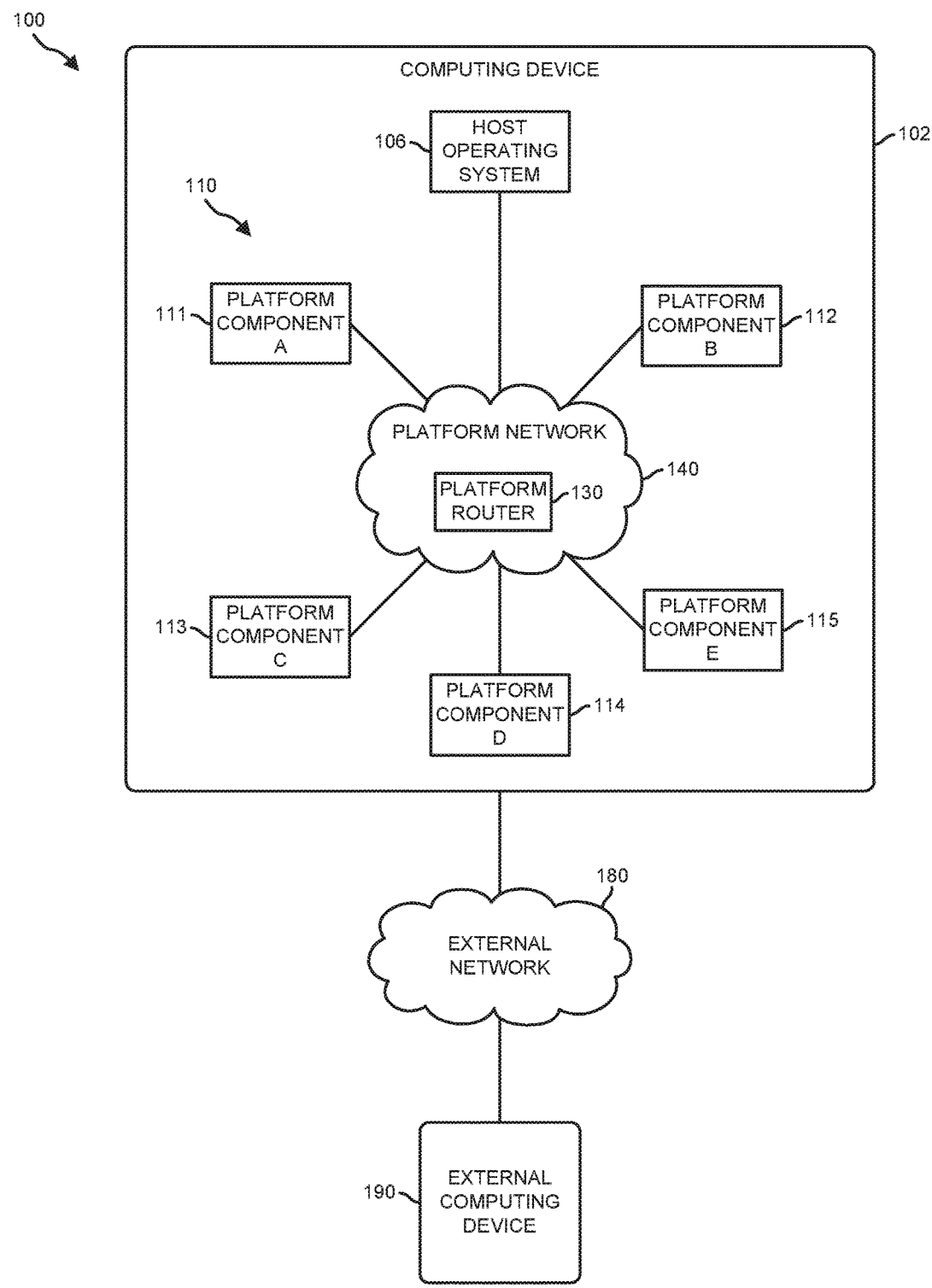
FIG. 1 is a simplified block diagram of at least one embodiment of a system for intra-platform communications with local components of a computing device via a platform router.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for intra-platform communications includes a computing device 102 and, in some embodiments, an external network 180 and an external computing device 190. The computing device 102 includes one or more local components 110 (e.g., the platform components 106, 111, 112, 113, 114, 115) and a platform router 130. The one or more local components 110 may be embodied as one or more hardware components, software components, and/or a combination of hardware and software components of the computing device 102. Additionally, the one or more local components 110 may be communicatively coupled to the platform router 130 via one or more existing logical and/or physical communication links (e.g., point-to-point links, bus links, wires, cables, light guides, printed circuit board traces, etc.) to form a platform network 140. The platform router 130 may be embodied as one or more hardware components, software components, and/or a combination of hardware and software components of the computing device 102. For example, in some embodiments, the platform router 130 is embodied as a logical entity of the computing device 102. In such embodiments, the functionality of the platform router 130 may be provided by a single local component 110 of the computing device 102 (e.g., the platform component E 115) or it may be provided by more than one of the local components 110 of the computing device 102 (e.g., the platform component A 111 and the platform component E 115). Thus, the functionality of the platform router 130, and therefore the platform router 130 itself, may be implemented in either a centralized or a decentralized manner.

In use, the platform router 130 of the computing device 102 is configured to receive a network packet from a host operating system 106 and/or an application executing on the computing device 102. The platform router 130 may determine whether the network packet is destined for one of the local components 110 or an external computing device 190 (e.g. a device in communication with the computing device 102 via the external network 180) and, in response, may forward or otherwise send the network packet to the appropriate component and/or device. To do so, the platform router 130 may first intercept or otherwise receive a name resolution request from the host operating system 106 and/or an application being executed by the host operating system 106. The name resolution request includes the hostname of a target destination, which in some embodiments may be a hostname that has been assigned to one of the local components 110 (e.g., the platform component A 111). In response to intercepting the name resolution request, the platform router 130 may resolve or otherwise lookup the network address corresponding to the target destination (e.g., the platform component A 111) based at least in part on, or otherwise as a function of, the hostname. The corresponding network address may thereafter be sent to the host operating system 106 and/or the application being executed by the host operating system 106 in response. Subsequently, the platform router 130 may receive or otherwise intercept a network packet destined for the target destination (e.g., the platform component A 111). The network packet received from the host operating system 106 and/or the application being executed by the host operating system 106 may include the network address for the target destination (e.g., the platform component A 111) as a destination address. Based on the destination address, the platform router 130 may determine that the network packet is destined for one of the local components 110 (e.g., the platform component A 111) or a device external to the computing device (e.g., the external computing device 190). Upon making such determination, the platform router 130 may forward or otherwise send the network packet to the appropriate component and/or device via the platform network 140, which as discussed, may include one or more logical and/or physical communication links (e.g., point-to-point links, bus links, wires, cables, light guides, printed circuit board traces, etc.) between the local components 110 of the computing device 102 and the platform router 130.

In some embodiments, each of the one or more local components 110 may include network protocol functionality and, as a result, may support receiving messages formatted as network packets. However, in other embodiments, one or more of the local components 110 may not include network protocol functionality and, therefore, may not support receiving messages formatted as network packets (e.g., legacy components or other components lacking network protocol functionality). As such, in some embodiments, the platform router 130 may further be configured to determine whether the target destination of a received network packet (e.g., the platform component A 111) supports network protocol functionality. If the target destination of the received network packet (e.g., the platform component A 111) lacks network protocol functionality, the platform router 130 may first translate the received network packet into a format that is supported by the target destination (e.g., the platform component A 111). The transmitted network packet may then be transmitted to the target destination (e.g., the platform component A 111) in the supported format. If, however, the target destination of the received network packet (e.g., the platform component A 111) supports network protocol functionality, the platform router 130 may send or otherwise forward the network packet to the target destination (e.g., the platform component A 111) without translation.

As discussed, the platform router 130 may intercept a name resolution request sent by the host operating system 106 and resolve a hostname included therein to determine a corresponding network address, which may be assigned to one of the local components 110 (e.g., the platform component A 111) and/or a device external to the computing device 102 (e.g., the external computing device 190). The platform router 130 may subsequently receive a network packet from the host operating system 106 and/or an application being executed by the host operating system 106. In response to receiving the network packet, the platform router 130 may determine whether the destination network address included therein corresponds to one of the network addresses assigned to one or more of the local components 110 (e.g., the platform component A 111). In response to making such a determination, the platform router 130 may send the received network packet to the corresponding local component 110 (e.g., the platform component A 111) via the platform network 140 using one or more network protocols (e.g., Internet Protocol, etc.), which may be substantially similar to those required to communicate over the external network 180. In that way, an additional and/or alternate communication channel (e.g., the platform network 140) may be provided to facilitate communications between the host operating system 106 (or an application executed by the host operating system 106) and the one or more local components 110 (e.g., the platform component A 111) in instances wherein the provider of the host operating system 106 prevents the one or more local components 110 from being exposed to the host operating system 106 (or an application executed by the host operating system 106). Of course, it should be appreciated that the additional and/or alternate communication channel (e.g., the platform network 140) may be provided to facilitate communications between the host operating system 106 (or an application executed by the host operating system 106) and the one or more local components 110 (e.g., the platform component A 111) in instances wherein the provider of the host operating system 106 permits one or more of the local components 110 from to exposed to the host operating system 106 (or an application executed by the host operating system 106). For example, in some embodiments, the platform network 140 may be provided to supplement conventional communications between the host operating system 106 (or an application executed by the host operating system 106) and the one or more local components 110 (e.g., the platform component A 111).

Additionally or alternatively, in some embodiments, the platform router 130 may also be configured to receive a name resolution request and a network packet from one or more of the local components 110 (e.g., the platform component B 112), which as discussed, may be embodied as one or more hardware components, software components, and/or a combination of hardware and software components of the computing device 102. In such embodiments, the platform router 130 may determine whether the network packet is destined for another one of the local components 110 (e.g., the platform component A 111) or a device external to the computing device 102 (e.g., the external computing device 190). In response to determining that the network packet is destined for another one of the local components 110 (e.g., the platform component A 111), the platform router 130 may send the received network packet to the corresponding local component 110 (e.g., the platform component A 111) via the platform network 140 using one or more network protocols (e.g., Internet Protocol, etc.). To do so, the platform router 130 may be configured to perform a process similar to the one discussed in more detail below.

Figure 2:
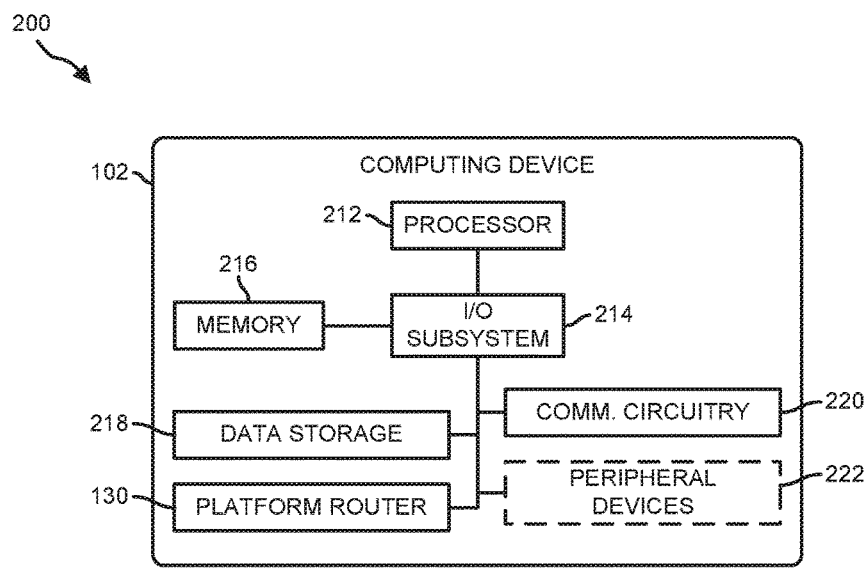
FIG. 2 is a simplified block diagram of at least one embodiment of the computing device of the system of FIG. 1.

The computing device 102 may be embodied as any type of computing device capable of performing the functions described herein including, but not limited to, a desktop computer, a set-top box, a smart display device, a server, a mobile phone, a smart phone, a tablet computing device, a personal digital assistant, a consumer electronic device, a laptop computer, a smart display device, a smart television, and/or any other computing device. As shown in FIG. 2, the illustrative computing device 102 includes a processor 212, a memory 216, an input/output (I/O) subsystem 214, a data storage 218, communication circuitry 220, and the platform router 130. Of course, the computing device 102 may include other or additional components, such as those commonly found in a computer and/or server (e.g., various input/output devices), in other embodiments. In some embodiments, one or more of the illustrative components may be incorporated in, or otherwise form a portion of, another component. For example, the memory 216, or portions thereof, may be incorporated in the processor 212 in some embodiments.

Additionally, as discussed above, the computing device 102 includes one or more local components 110 (e.g., the platform components 106, 111, 112, 113, 114, 115), which may be embodied as one or more hardware components, software components, and/or a combination of hardware and software components of the computing device 102. As such, each of the local components 110 may embody a different one of the processor 212, the memory 216, the I/O subsystem 214, the data storage 218, and the communication circuitry 220 of the computing device 102. For example, in some embodiments, the platform component A 111 may embody the processor 212, the platform component B 112 may embody the I/O subsystem 214, the platform component C 113 may embody the memory 216, the platform component D 114 may embody the data storage 218, and the platform component E 115 may embody the communication circuitry 220. Of course, it should be understood that the one or more local components 110 may embody additional or different hardware and/or software components of the computing device 102, such as a graphics card, RAID controller, and/or other computing device components.

The processor 212 may be embodied as any type of processor capable of performing the functions described herein. For example, the processor 212 may be embodied as a single or multi-core processor(s), digital signal processor, microcontroller, or other processor or processing/controlling circuit. Similarly, the memory 216 may be embodied as any type of volatile or non-volatile memory or data storage capable of performing the functions described herein. In operation, the memory 216 may store various data and software used during operation of the computing device 102 such as operating systems, applications, programs, libraries, and drivers. The memory 216 is communicatively coupled to the processor 212 via the I/O subsystem 214, which may be embodied as circuitry and/or components to facilitate input/output operations with the processor 212, the memory 216, and other components of the computing device 102. For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a system-on-a-chip (SoC) and be incorporated, along with the processor 212, the memory 216, and other components of the computing device 102, on a single integrated circuit chip.

The communication circuitry 220 of the computing device 102 may be embodied as any type of communication circuit, device, interface, or collection thereof, capable of enabling communications between the computing device 102, the external computing device 190, and/or other computing devices. For example, the communication circuitry 220 may be embodied as one or more network interface controllers (NICs), in some embodiments. The communication circuitry 220 may be configured to use any one or more communication technologies (e.g., wireless or wired communications) and associated protocols (e.g., Ethernet, Wi-Fi®, WiMAX, etc.) to effect such communication.

In some embodiments, the computing device 102 and the external computing device 190 may communicate with each other over the external network 180. The external network 180 (see FIG. 1) may be embodied as any number of various wired and/or wireless communication networks. For example, the external network 180 may be embodied as or otherwise include a local area network (LAN), a wide area network (WAN), a cellular network, or a publicly-accessible, global network such as the Internet. Additionally, the external network 180 may include any number of additional devices to facilitate communication between the computing device 102, the external computing device 190, and/or the other computing devices.

The external computing device 190 may be embodied as any type of computing device capable of performing the functions described herein. As such, the external computing device 190 may include devices and structures commonly found in computing devices such as processors, memory devices, communication circuitry, and data storages, which are not shown in FIG. 1 for clarity of the description. In some embodiments, the external computing device 190 is configured to send and receive network packets to and from the computing device 102 over the external network 180. As discussed in more detail below, the network packets sent to and received from the computing device 102 may be embodied as network packets formatted according to one or more network communication protocols (e.g., Internet Protocol, etc.).

Referring back to FIG. 2, the data storage 218 may be embodied as any type of device or devices configured for short-term or long-term storage of data such as, for example, memory devices and circuits, memory cards, hard disk drives, solid-state drives, or other data storage devices. In some embodiments, the data storage 218 may include one or more network address records. As described in more detail below, each of the network address records may correspond to a different one of the one or more local components 110 and may include, among other things, information indicative of the hostname and network address assigned the corresponding local component 110. In this way, the data storage 218 may include a mapping of the hostnames and the network addresses assigned to each of the one of more local components 110 of the computing device 102. Of course, it should be appreciated that the data storage 218 may also include information indicative of the hostname and network address assigned a device external to the computing device 102 (e.g., the external computing device 190) in some embodiments. The data storage 218 may also include any other type of information required for operation of the computing device 102. For example, in some embodiments, the data storage 218 may also include a list of network addresses currently assigned to the one or more local components 110 of the computing device 102. As discussed in more detail below, the list of assigned network addresses may be used by the computing device to facilitate determining whether a network packet is destined for one of the local components 110 or a device external to the computing device 102 (e.g., the external computing device 190). Additionally or alternatively, the data storage 218 may include information indicative of whether each of the one or more local components 110 includes network protocol functionality.

Additionally, in some embodiments, the computing device 102 may further include one or more peripheral devices 222. Such peripheral devices 222 may include any type of peripheral device commonly found in a computing device such as additional data storage, speakers, a hardware keyboard, input/output devices, peripheral communication devices, and/or other peripheral devices.

As discussed in more detail below, in some embodiments, a host operating system 106 and/or an application executing on the host operating system 106 may communicate with each of the local components 110 (e.g., the processor 212, the memory 216, the I/O subsystem 214, the data storage 218, and the communication circuitry 220) via the platform network 140 using a network protocol (e.g., Internet Protocol). In such embodiments, the host operating system 106, the platform router 130, and each of the local components 110 may include network protocol functionality. For example, the host operating system 106, the platform router 130, and each of the local components 110 may be configured with a network protocol stack (e.g., Transmission Control Protocol/Internet Protocol (TCP/IP)) to facilitate communications via the platform network 140. In some embodiments, however, one or more of the local components 110 may be a legacy component or otherwise not include network protocol functionality. That is, one or more of the local components 110 may not be configured with a network protocol stack and, as a result, may not support communicating with the host operating system 106 via the platform network 140 using a network protocol (e.g., Internet Protocol). As discussed in more detail below, the platform router 130 may translate network communications (e.g., network packets) received from the host operating system 106 into a format supported by those local components 110 that do not include network protocol functionality. Of course, it should be appreciated that the platform router 130 may also translate communication messages received from one or more of the local components 110 that do not include network protocol functionality into one or more network packets, which may subsequently be sent by the platform router 130 to the host operating system 106 and/or the application executing on the host operating system 106 via the platform network 140.

Figure 3:
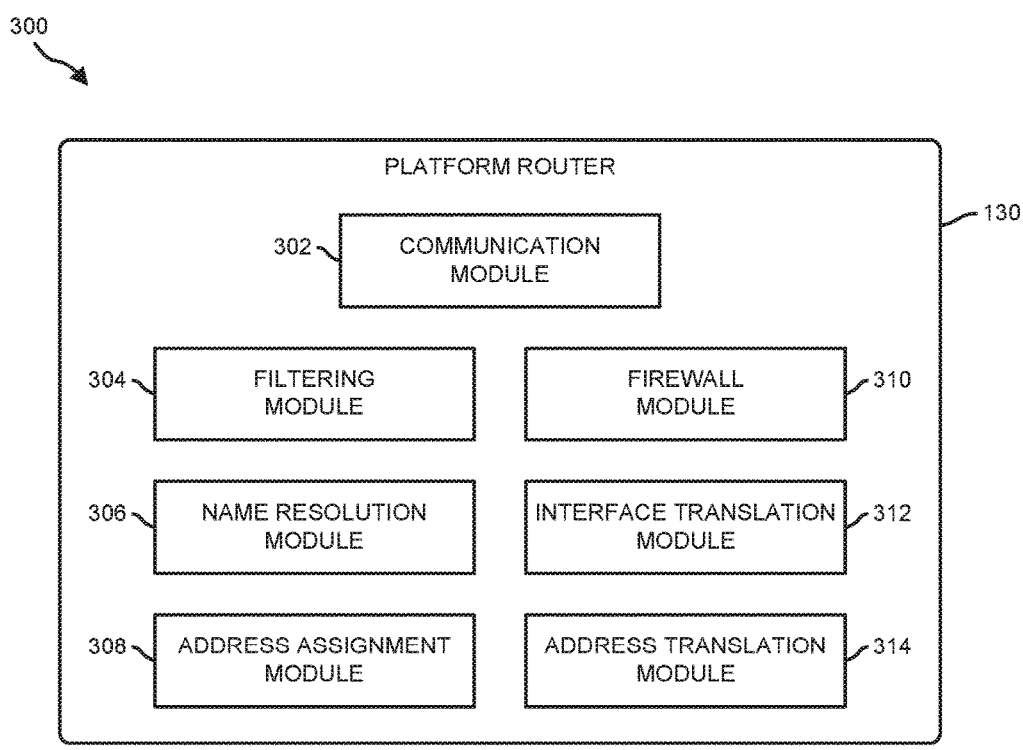
FIG. 3 is a simplified block diagram of at least one embodiment of an environment of the platform router of the system of FIG. 1.

Referring now to FIG. 3, in use, the platform router 130 of the computing device 102 establishes an environment 300 during operation. The illustrative environment 300 includes a communication module 302, a filtering module 304, a name resolution module 306, and address assignment module 308, a firewall module 310, and interface translation module 312, and an address translation module 314. Each of the modules 302, 304, 306, 308, 310, 312, 314 of the environment 300 may be embodied as hardware, software, firmware, or a combination thereof. Of course, it should be appreciated that the platform router 130 may include other components, sub-components, modules, and devices commonly found in a computing device, which are not illustrated in FIG. 3 for clarity of the description. Additionally, although the illustrative environment 300 is described below as facilitating communications between the host operating system 106 (or an application being executing by the host operating system 106) and one or more of the local components 110, it should be appreciated that the environment 300 may, additionally or alternatively, facilitate communications between one of the local components 110 (e.g., the platform component B 112) and another one of the local components 110 (e.g., the platform component A 111) in other embodiments.

The communication module 302 of the platform router 130 facilitates communications between components or sub-components of the computing device 102 and the external computing device 190 and/or the other computing devices. For example, in some embodiments, the communication module 302 facilitates communications between the host operating system 106 and one or more of the local components 110 via the platform network 140. In such embodiments, the communications between the host operating system 106 and the one or more local components 110 via the platform network 140 may be embodied as one or more network packets (e.g., Internet Protocol packets) and/or communication messages in a format supported by the one or more local components 110 (e.g., messages formatted according to the Peripheral Component Interconnect (PCI) standard, messages formatted according to the Universal Serial Bus (USB) standard, etc.). In some embodiments, the communication module 302 also facilities communications over the external network 180 between the computing device 102, the host operating system 106, and/or one or more applications executing on the host operating system 106 and the external computing device 190. In such embodiments, the communications between the computing device 102, the host operating system 106, and/or one or more applications executing on the host operating system 106 and the external computing device 190 may be embodied as one or more network packets (e.g., Internet Protocol packets).

The filtering module 304 may be configured to intercept network communications generated by the host operating system 106 and/or one or more applications being executed by the host operating system 106. For example, in some embodiments, the filtering module 304 may intercept a name resolution request generated by the host operating system 106 and/or the one or more applications being executed by the host operating system 106. The name resolution request includes the hostname of a target destination, which as discussed, may correspond one of the local components 110 of the computing device 102 or the external computing device 190. In some embodiments, the name resolution request is embodied as a Domain Name System (DNS) request. Of course, it should be appreciated that although the illustrative name resolution request is embodied as a DNS request, the name resolution request may be embodied as other any other type of name resolution request (e.g., a request to query a locally stored hosts file, etc.).

The filtering module 304 may be further configured to intercept or otherwise receive a network packet generated by the host operating system 106 and/or one or more applications being executed by the host operating system 106. In some embodiments, the network packet received from the host operating system 106 and/or the application includes the network address assigned to the target destination as the destination address. The network address assigned to the target destination may be embodied as an Internet Protocol (IP) address (e.g., and IPv4 or an IPv6) or it may be embodied as any other type of network address suitable for communicating via the platform network 140 and/or the external network 180. Additionally or alternatively, the filtering module 304 may also be configured to intercept or otherwise receive an address request from one or more of the local components 110 to be assigned a network address for communications via the platform network 140.

In embodiments wherein the intercepted network packet includes the network address assigned to the target destination as destination address, the filtering module 304 may further be configured to determine whether the network packet is destined for one of the local components 110 of the computing device 102 or whether it is destined for an external device (e.g., the external computing device 190). To do so, the filtering module 304 may determine whether the destination address of the received network packet corresponds to one of the local components 110. In some embodiments, the filtering module 304 may compare the destination address against a list including the network addresses currently assigned to one or more of the local components 110 of the computing device 102. In such embodiments, the filtering module 304 may determine that the destination address of the received network packet corresponds to one of the local components 110 in response to matching the destination address with one of the network addresses included in the list. If, however, the filtering module 304 is unable to match the destination address with one of the network addresses included in the list, the filtering module 304 may instead determine that the destination address corresponds to a device external to the computing device 102 (e.g., the external computing device 190).

Figure 5:
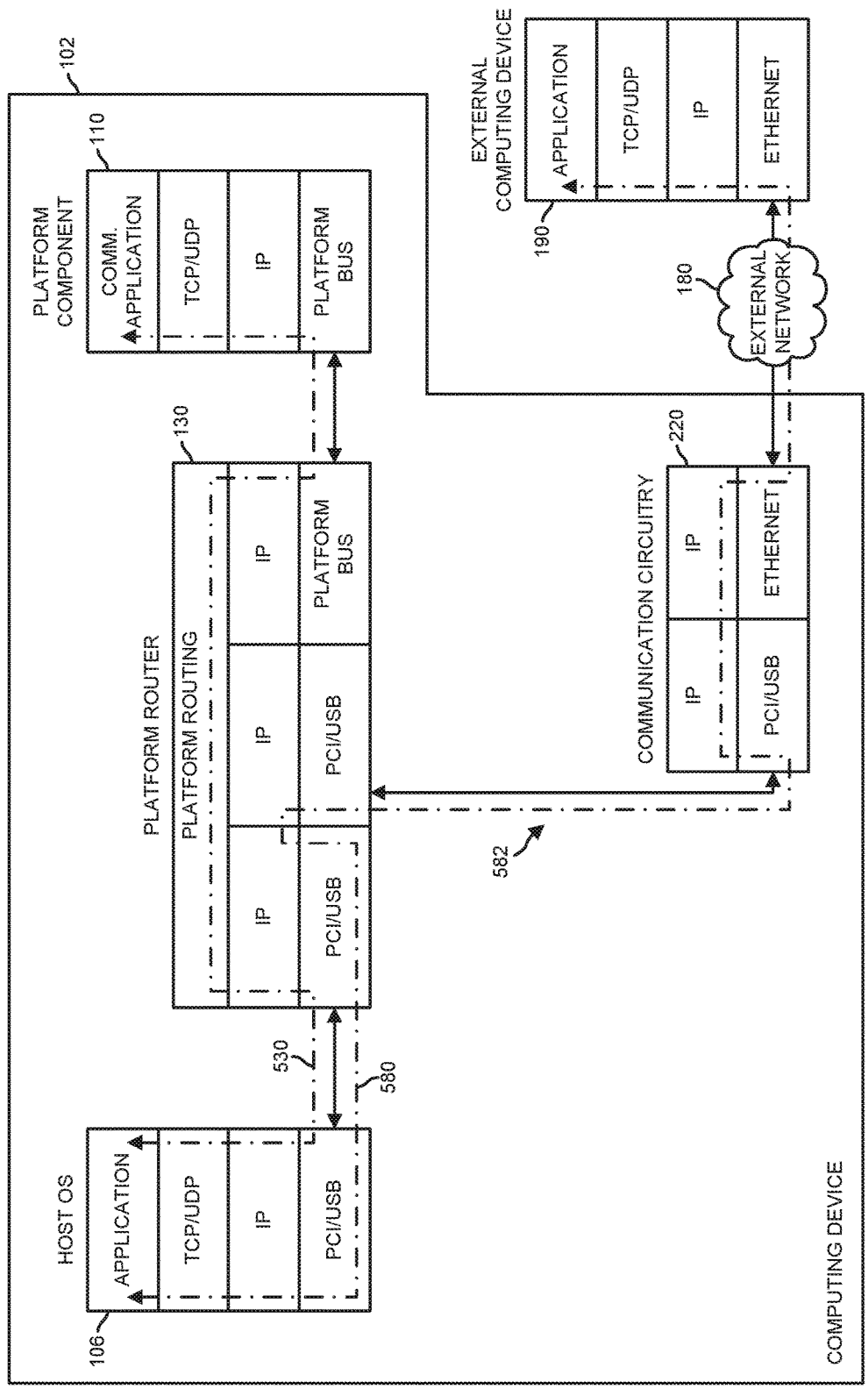
FIG. 5 is a simplified activity flow diagram of at least one embodiment of the method of FIG. 4 for communicating with local components of the computing device via the platform router.

The filtering module 304 may also be configured to transmit or otherwise forward the received network packet to the appropriate target destination device (e.g., one of more of the local components 110 or the external computing device 190). For example, in embodiments wherein it is determined that the destination address of the received network packet corresponds to one of the local components 110, the filtering module 304 may transmit or otherwise forward the network packet to the corresponding one of the local components 110 via the platform network 140, which as discussed, may include one or more existing logical and/or physical communication links (e.g., point-to-point links, bus links, wires, cables, light guides, printed circuit board traces, etc.) of the computing device 102 (e.g., as illustratively shown by data flow 530 of FIG. 5). However, in embodiments wherein it is determined that the destination address of the received network packet corresponds to an external computing device (e.g., the external computing device 190), the filtering module 304 may instead forward or otherwise facilitate the transmission of the network packet to the external computing device 190 over the external network 180 (e.g., as illustratively shown by data flow 580 of FIG. 5). To do so, the filtering module 304 may send the externally-bound network packet to one or more components of the computing device 102 for further processing. For example, in some embodiments, the filtering module 304 may send the network packet to a network protocol stack of the communication circuitry 220 (e.g., as illustratively shown by data flow 582 of FIG. 5), which may subsequently forward the message to the external computing device 190 via the external network 180.

Additionally, in some embodiments, the filtering module 304 may determine the particular local component and corresponding network protocol stack to which the externally-bound network packet should be sent based at least in part on an earlier determination made by the host operating system 106. For example, in embodiments wherein the communication circuitry 220 includes one or more network interface controllers (NICs) (e.g., two or more NICs), the host operating system 106 may first determine which of the two or more NICs should handle (e.g., further process) the network packet upon initial receipt. Thereafter, in response to later determining the destination address of the received network packet corresponds to an external computing device (e.g., the external computing device 190), the filtering module 304 may send the externally-bound network packet to the network protocol stack corresponding to the network interface controller (NIC) originally chosen by the host operating system 106 to handle (e.g., further process) the packet. Of course, it should be appreciated that, in other embodiments, the filtering module 304 may instead send the externally-bound network packet to a network protocol stack corresponding to another NIC (e.g., a different NIC than the one originally chosen by the host operating system 106).

As discussed, in some embodiments, the filtering module 304 is configured to receive or otherwise intercept a name resolution request generated by the host operating system 106 and/or the one or more applications being executed by the host operating system 106. The name resolution request (e.g., the DNS request) includes the hostname of a target destination, which as discussed, may correspond one of the local components 110 of the computing device 102 or the external computing device 190. In such embodiments, the name resolution module 306 is configured to translate the included hostname into the network address assigned to the target destination. To do so, the name resolution module 306 may resolve or otherwise lookup the hostname to obtain the corresponding network address assigned to the target destination (e.g., one of the local components 110 or the external computing device 190). In some embodiments, the name resolution module 306 may compare the hostname included in the received name resolution request with the hostnames included in each of the network address records stored in the data storage 218. In such embodiments, the name resolution module 306 may retrieve the corresponding network address from the network address record including a hostname that matches the hostname included in the name resolution request. In response to resolving the hostname included in the name resolution request, the name resolution module 306 may send a response to the host operating system 106 and/or the one or more applications being executed by the host operating system 106 that includes the corresponding network address.

Additionally, in some embodiments, the name resolution module 306 may be configured to only resolve or otherwise lookup hostnames that correspond to one or more of the local components 110 of the computing device 102. For example, in some embodiments, the hostname included in the name resolution request may include a pseudo-top-level domain (e.g., .local, etc.) appended thereto. Thus, the hostname included in the name resolution request may be embodied as a fully qualified domain name (FQDN) (e.g., hostname.local, componentA.local, etc.). In such embodiments, the name resolution module 306 may be configured to determine whether the hostname corresponds to one of the local components 110 of the computing device 102 based at least in part on the hostname (e.g., the FQDN). In embodiments wherein the hostname (e.g., the FQDN) included in the name resolution request does not correspond to one of the local components 110 of the computing device 102, the name resolution module 306 may instead determine that the hostname (e.g., the FQDN) corresponds to a device external to the computing device 102 (e.g., the external computing device 190). As a result, the name resolution module 306 may be configured to forward or other facilitate the transmission of (e.g., via the communication module 302 and/or the communication circuitry 220) the name resolution request to an external name resolution server (not shown) for further processing.

As discussed, in some embodiments, the filtering module 304 is configured to receive or otherwise intercept an address request from one or more of the local components 110 to be assigned a network address for communications via the platform network 140. In response to an address assignment request being received from one of the local components 110, the address assignment module 308 may be configured to assign a network address (e.g., an IPv4 network address, an IPv6 network address, etc.) to the local component 110 requesting assignment. In some embodiments, the address assignment module 308 may be configured to assign network addresses to one or more of the local components 110 according to any suitable network address assignment protocol or procedure (e.g., Dynamic Host Configuration Protocol (DHCP), Bootstrap Protocol (BOOTP), etc.). Additionally, the address assignment module 308 may assign either a public network address (e.g., accessible by devices and components external to the computing device 102) or a private network address (e.g., only accessible by local devices and components of the computing device 102 capable of communicating via the platform network 140) to one or more of the local components 110 requesting assignment of a network address.

The firewall module 310 may be configured to protect the one or more local components 110 from being accessed by an unauthorized source. For example, in some embodiments, the firewall module 310 may monitor network packets received from the host operating system 106, one or more applications executing on the host operating system 106, and/or one or more devices external to the computing device 102 (e.g. the external computing device 190). The firewall module 310 may determine whether any of the received network packets are destined for one of the local components 110 of the computing device 102. In response to determining that one or more of the received network packets are destined for one of the local components 110, the firewall module 310 may determine whether the source of the network packet (e.g., the host operating system 106, one or more applications executing on the host operating system 106, and/or the devices external to the computing device 102) are authorized to communicate with the local component 110 of the computing device 102. To do so, the firewall module 310 may determine whether the source of the network packet is permitted to communicate with the local component 110 based at least in part on, or otherwise as a function of, one or more rules or policies regarding the security of the one or more local components 110. For example, in one embodiment, the firewall module 310 may determine from a rule and/or a policy that a particular source of an incoming network packet is only permitted to communicate with a particular local component 110 (e.g., the platform component A 111) of the computing device 102 in response to determining that the source is either the host operating system 106 or another one of the local components 110 (e.g., the platform components B-E 112, 113, 114, 115,) of the computing device 102. As another example, the firewall module 310 may deny access, based on a rule and/or a policy, to the one or more local components 110 in response to determining that the source of an incoming network packet is a device external to the computing device 102 (e.g., the external computing device 190) or a particular component of the computing device 102 (e.g., the communication circuitry 220). Of course, it should be appreciated that the firewall module 310 may use any number of different policies or rules to either permit or deny communication access to one or more of the local components 110. Additionally, it should be appreciated that although the firewall module 310 prevents other components and/or devices from communicating with the local components 110 in the illustrative embodiment, the firewall module 310 may also permit and/or deny communications originating from the local components 110 themselves, in other embodiments. It that way, the firewall module 310 may be embodied as a bidirectional firewall.

In some embodiments, the interface translation module 312 may be configured to translate communications between one or more of the local components 110 and the host operating system 106 and/or an application executing on the host operating system 106. As discussed, one or more of the local components 110 may be a legacy component or otherwise not include network protocol functionality (e.g., not include a corresponding network protocol stack). For example, in some embodiments, one or more of the local components may only support communications transmitted in accordance with a local bus communication standard or protocol (e.g., the Peripheral Component Interconnect (PCI) standard, the Universal Serial Bus (USB) standard, etc.). In such embodiments, the interface translation module 312 may be configured to translate a network packet received from the host operating system 106 and/or an application executing on the host operating system 106 into a format supported or otherwise understood by the targeted local component 110 (e.g., the platform component A 111). For example, the interface translation module 312 may remove the header information (e.g., TCP header, IP header, Network Interface header/Media Access Control address, etc.) from the network packet to extract the data encapsulated therein, which may be in a format supported by the targeted local component 110 (e.g., the platform component A 111). Of course, it should be appreciated that the interface translation module 312 may also translate data in a format supported by a source local component 110 (e.g., the platform component B 112) into a network packet, which may be transmitted or otherwise forwarded to the host operating system 106 and/or the application executing on the host operating system 106. For example, the interface translation module 312 may encapsulate or otherwise repackage the data from the source local component 110 (e.g., the platform component B 112) into a network packet including the necessary network packet header information (e.g., TCP header, IP header, Network Interface header/Media Access Control address, etc.).

As discussed, in some embodiments, the address assignment module 308 may assign a private network address (e.g., only accessible by local devices and components of the computing device 102 capable of communicating via the platform network 140) to one or more of the local components 110. In such embodiments, the address translation module 314 may be configured to translate between one or more private network addresses assigned to one or more of the local components 110 and a public network address, which may be assigned to the platform router 130. To do so, in some embodiments, the address translation module 314 may receive a network packet destined for one of the local components 110. The received network packet may include the public network address of the platform router 130 as a destination address and a port number, which may correspond to the local component 110 destination (e.g., the platform component A 111). In such embodiments, the address translation module 314 may replace (e.g., translate) the destination address of the received network packet (e.g., the public network address of the platform router 130) with the private network address assigned to the local component 110 destination (e.g., the platform component A 111) based on the port number corresponding to the local component destination 110 (e.g., the platform component A 111). Thereafter, the address translation module 314 may forward or otherwise transmit the received network packet to the appropriate local component destination 110 (e.g., the platform component A 111). Of course, it should be appreciated that the address translation module 314 may be configured to operate bidirectionally. That is, in some embodiments, the address translation module 314 may be configured to receive an outgoing network from a local component 110 (e.g., the platform component A 111) configured with a private network address. In such embodiments, the address translation module 314 may replace the source address of the outgoing network packet (e.g., the private network address of the platform component A 111) with the public address of the platform router 130. In doing so, the address translation module 314 may also include a source port address (e.g., the port address assigned to the platform component A 111) in the outgoing network packet. Of course, it should be appreciated that the address translation module 314 may be configured to translate between network addresses according to any suitable network address translation protocol or procedure (e.g., Network Address Translation (NAT), Network Address and Port Translation (NAPT), etc.).

Figure 4:
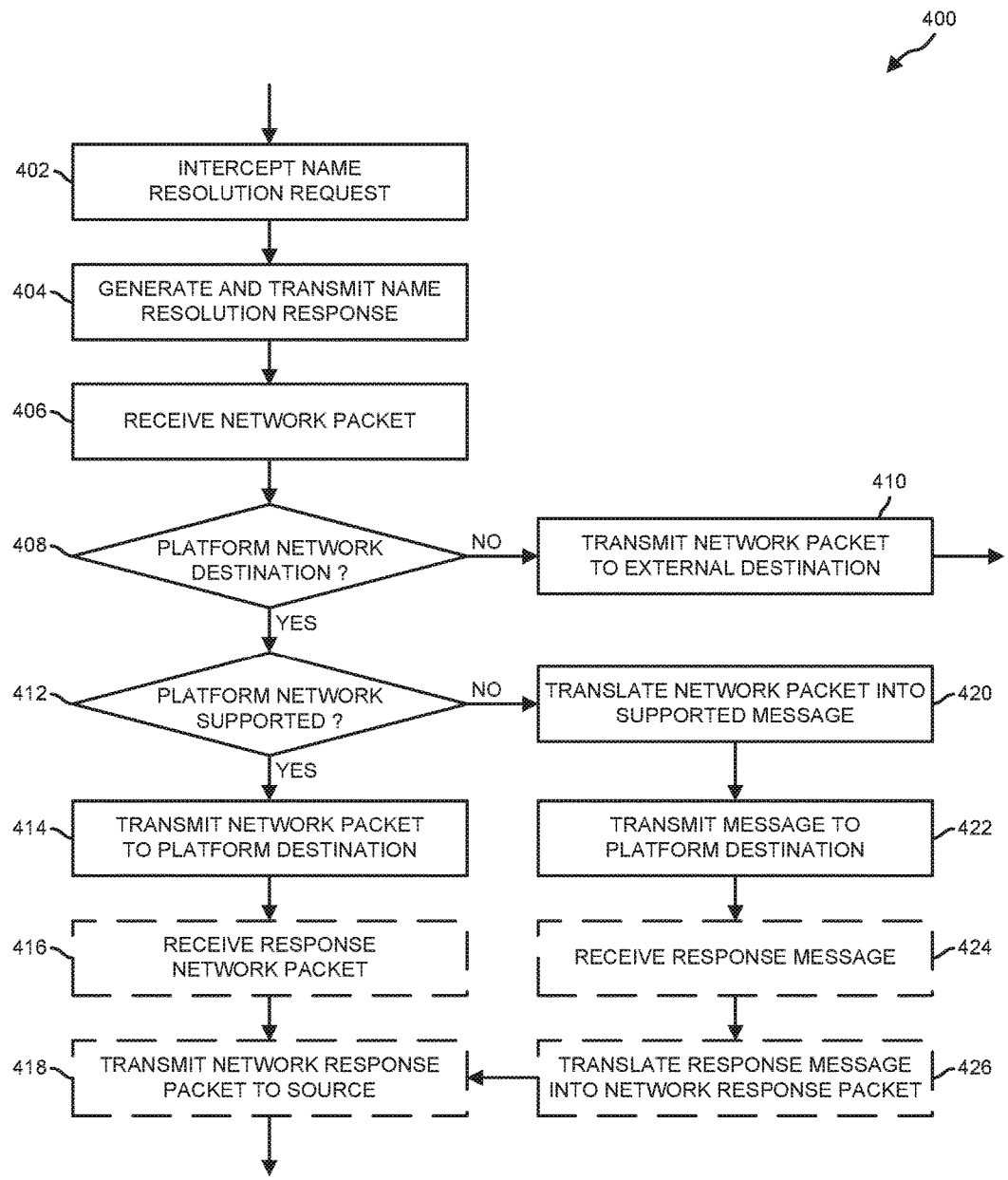
FIG. 4 is a simplified flow diagram of at least one embodiment of a method that may be executed by the computing device of FIGS. 1 and 2 for communicating with local components via the platform router.

Referring now to FIG. 4, in use, the computing device 102 of the system 100 may execute a method 400 for communicating with the local components 110 of the computing device 102 via the platform router 130. The method 400 begins with block 402 in which the platform router 130 intercepts or otherwise receives a name resolution request from the host operating system 106 and/or an application executing on the host operating system 106. The name resolution request may include the hostname of a target destination, which in some embodiments may be a hostname that has been assigned to one of the local components 110 (e.g., the platform component A 111). After intercepting the name resolution request, the method 400 advances to block 404.

In block 404, the platform router 130 generates and transmits a response to the name resolution request. To do so, the platform router 130 resolves or otherwise looks up the hostname included in the received name resolution request to determine a corresponding network address (e.g., the network address corresponding to the hostname). In some embodiments, the platform router 130 may compare the hostname included in the received name resolution request with the hostnames included in each of a plurality of network address records stored in the data storage 218. As discussed, each of the plurality of network address records may correspond to a different one of the one or more local components 110 and may include, among other things, information indicative of the hostname and network address assigned the corresponding local component 110. After determining the network address corresponding to the hostname included in the received name resolution request, the platform router 130 may generate and transmit a response including the determined network address to the host operating system 106 and/or the application executing on the host operating system 106.

In block 406, the platform router 130 receives or otherwise intercepts a network packet transmitted by the host operating system 106 and/or the application executing on the host operating system 106. The network packet received from the host operating system 106 may include the network address for the target destination as a destination address. After receiving the network packet from the host operating system 106 and/or the application executing on the host operating system 106, the method 400 advances to block 408.

In block 408, the platform router 130 determines whether the network packet is destined for one of the local components 110 (e.g., the platform component A 111) or a device external to the computing device (e.g., the external computing device 190). To do so, the platform router 130 may determine whether the destination address of the received network packet corresponds to one of the local components 110. In some embodiments, the platform router 130 may compare the destination address against a list including the network addresses currently assigned to one or more of the local components 110 of the computing device 102. In such embodiments, the platform router 130 may determine that the destination address of the received network packet corresponds to one of the local components 110 (e.g., the platform component A 111) in response matching the destination address with one of the network addresses included in the list. If, however, the platform router 130 is unable to match the destination address with one of the network addresses included in the list, the platform router 130 may instead determine that the destination address corresponds to a device external to the computing device 102 (e.g., the external computing device 190). Additionally or alternatively, the platform router 130 may determine that the destination address of the received network packet corresponds to one of the local components 110 as a function of one or more of the network address records maintained in the data storage 218. If, in block 408, the platform router 130 determines that the destination address of the received network packet corresponds to one of the local components 110, the method 400 advances to block 412. If, however, the platform router 130 instead determines that the destination address of the received network packet does not correspond to one of the local components 110, the method 400 advances to block 410 in which the platform router 130 transmits or otherwise forwards the received network packet to another component of the computing device 102 (e.g., the communication circuitry 220, etc.) and/or a device external to the computing device 102 (e.g., the external computing device 190).

In block 412, the platform router 130 determines whether the target destination of the received network packet (e.g., the platform component A 111) supports network protocol functionality. If, in block 412, the platform router 130 determines that the target destination of the received network packet (e.g., the platform component A 111) supports network protocol functionality, the method 400 advances to block 414 in which the platform router 130 sends or otherwise forwards the network packet to the target destination (e.g., the platform component A 111) as is. If, however, the platform router 130 determines instead that the target destination of the received network packet (e.g., the platform component A 111) lacks network protocol functionality, the method 400 advances to block 420.

In some embodiments, the platform router 130 may receive, in block 416, a response to the network packet from the target destination (e.g., the platform component A 111). In such embodiments, in block 418, the platform router 130 transmits or otherwise forwards the response network packet to the host operating system 106 and/or the application executing on the host operating system 106.

In block 420, the platform router 130 translates the received network packet into a format supported by the target destination (e.g., the platform component A 111). To do so, in some embodiments, the platform router 130 removes the header information from the network packet (e.g., TCP header, IP header, Network Interface header/Media Access Control address, etc.) to extract the data encapsulated therein, which may be in a format supported by the target destination (e.g., the platform component A 111). After extracting the data encapsulated within the network packet, the method 400 advances to block 422 in which the platform router 130 sends or otherwise forwards the extracted data to the target destination (e.g., the platform component A 111).

Additionally or alternatively, in some embodiments, the platform router 130 may receive, in block 424, a response to the extracted data the target destination (e.g., the platform component A 111). The response to the extracted data may be embodied as a communication message in a format supported by the target destination (e.g., the platform component A 111). In such embodiments, in block 426, the platform router 130 translates or otherwise encapsulates the response communication message into a response network packet including the necessary network packet header information (e.g., TCP header, IP header, Network Interface header/Media Access Control address, etc.). After encapsulating the response communication message into a response network packet, the platform router 130, in block 418, transmits or otherwise forwards the response network packet to the host operating system 106 and/or the application executing on the host operating system 106.

EXAMPLES

Illustrative examples of the technologies disclosed herein are provided below. An embodiment of the technologies may include any one or more, and any combination of, the examples described below.

Example 1 includes a computing device to communicate with local components of the computing device, the computing device includes a filtering module to intercept a name resolution request from a host application executed on the computing device, the name resolution request includes a hostname of a target destination of a network packet; a name resolution module to (i) resolve the hostname to obtain a network address assigned to the target destination of the network packet, and (ii) transmit a response to the name resolution request to the host application, the response includes the network address assigned to the target destination of the network packet; and the filtering module is further to (i) receive the network packet from the host application destined for the network address assigned to the target destination of the network packet; (ii) determine whether the target destination of the network packet includes a local component of the computing device as a function of the network address assigned to the target destination of the network packet; and (iii) transmit the network packet to the local component of the computing device via a platform network in response to a determination that the target destination of the network packet includes the local component of the computing device.

Example 2 includes the subject matter of Example 1, and wherein the filtering module is further to forward the network packet to a device external to the computing device via an external network in response to the determination that the target destination of the network packet does not include the local component of the computing device.

Example 3 includes the subject matter of any of Examples 1 and 2, and wherein the filtering module is further to (i) receive a response network packet from the local component of the computing device; and (ii) transmit the response network packet to the host application executed on the computing device.

Example 4 includes the subject matter of any of Examples 1-3, and wherein the filtering module is further to (i) determine whether the local component of the computing device supports receipt of the network packet via the platform network in response to a determination that the target destination of the network packet includes the local component of the computing device; and (ii) translate the network packet into a message format supported by the local component in response to a determination that the local component does not support receipt of the network packet via the platform network; and wherein to transmit the network packet to the local component of the computing device includes to (i) transmit the translated network packet to the local component in the supported message format in response to a determination that the local component does not support receipt of the network packet via the platform network or (ii) transmit the network packet to the local component via the platform network without translation in response to a determination that the local component supports receipt of the network packet via the platform network.

Example 5 includes the subject matter of any of Examples 1-4, and wherein the filtering module is further to (i) receive a response message from the local component in response to the translated network packet transmitted to the local component, wherein the response message is in the message format supported by the local component; (ii) translate the response message into a response network packet; and (iii) transmit the response network packet to the host application executed on the computing device via the platform network.

Example 6 includes the subject matter of any of Examples 1-5, and further including an address assignment module to (i) receive an address request from the local component of the computing device for assignment of the network address; and (ii) assign the network address to the local component of the computing device.

Example 7 includes the subject matter of any of Examples 1-6, and wherein to assign the network address to the local component of the computing device includes to assign at least one of a private network address or a public network address to the local component of the computing device.

Example 8 includes the subject matter of any of Examples 1-7, and wherein to assign the network address to the local component of the computing device includes to assign a private network address to the local component of the computing device; and wherein the computing device further includes an interface translation module to translate between the private network address assigned to the local component of the computing device and a public network address assigned to the computing device.

Example 9 includes the subject matter of any of Examples 1-8, and wherein the name resolution module is further to (i) receive a name registration request from the local component of the computing device for registration of the assigned network address; and (ii) update a network address record for the local component of the computing device with the assigned network address, wherein the network address record for the local component associates the assigned network address with the hostname of the local component.

Example 10 includes the subject matter of any of Examples 1-9, and further including a firewall module to block network access to the local component of the computing device from a device external to the computing device.

Example 11 includes the subject matter of any of Examples 1-10, and wherein the network address includes an Internet Protocol address; and wherein the name resolution request includes a Domain Name Resolution request.

Example 12 includes a method for communicating with local components of a computing device, the method includes intercepting, on a platform router of a computing device, a name resolution request from a host application executing on the computing device, the name resolution request includes a hostname of a target destination of a network packet; resolving the hostname to obtain a network address assigned to the target destination of the network packet; transmitting, on the platform router, a response to the name resolution request to the host application, the response includes the network address assigned to the target destination of the network packet; receiving, on the platform router, the network packet from the host application destined for the network address assigned to the target destination of the network packet; determining, on the platform router, whether the target destination of the network packet includes a local component of the computing device as a function of the network address assigned to the target destination of the network packet; and transmitting, on the platform router, the network packet to the local component of the computing device via a platform network in response to determining that the target destination of the network packet includes the local component of the computing device.

Example 13 includes the subject matter of Example 12, and further including forwarding, on the platform router, the network packet to a device external to the computing device via an external network in response to determining that the target destination of the network packet does not include the local component of the computing device.

Example 14 includes the subject matter of any of Examples 12 and 13, and further including receiving, on the platform router, a response network packet from the local component of the computing device; and transmitting, on the platform router, the response network packet to the host application executing on the computing device.

Example 15 includes the subject matter of any of Examples 12-14, and further including determining, on the platform router, whether the local component of the computing device supports receiving the network packet via the platform network in response to determining that the target destination of the network packet includes the local component of the computing device; translating, on the platform router, the network packet into a message format supported by the local component in response to determining that the local component does not support receiving the network packet via the platform network; and wherein transmitting the network packet to the local component of the computing device includes (i) transmitting the translated network packet to the local component in the supported message format in response to determining that the local component does not support receiving the network packet via the platform network, or (ii) transmitting the network packet to the local component via the platform network without translation in response to determining that the local component supports receiving the network packet via the platform network.

Example 16 includes the subject matter of any of Examples 12-15, and further including receiving, on the platform router, a response message from the local component in response to the translated network packet transmitted to the local component, wherein the response message is in the message format supported by the local component; translating, on the platform router, the response message into a response network packet; and transmitting, on the platform router, the response network packet to the host application executing on the computing device via the platform network.

Example 17 includes the subject matter of any of Examples 12-16, and further including receiving, on the platform router, an address request from the local component of the computing device requesting assignment of the network address; and assigning, on the platform router, the network address to the local component of the computing device.

Example 18 includes the subject matter of any of Examples 12-17, and wherein assigning the network address to the local component of the computing device includes assigning at least one of a private network address or a public network address to the local component of the computing device.

Example 19 includes the subject matter of any of Examples 12-18, and wherein assigning the network address to the local component of the computing device includes assigning a private network address to the local component of the computing device; and wherein the method further includes translating, on the platform router, between the private network address assigned to the local component of the computing device and a public network address assigned to the computing device.

Example 20 includes the subject matter of any of Examples 12-19, and further including receiving, on the platform router, a name registration request from the local component of the computing device requesting registration of the assigned network address; and updating, on the platform router, a network address record corresponding to the local component of the computing device with the assigned network address, wherein the network address record corresponding to the local component associates the assigned network address with the hostname of the local component.

Example 21 includes the subject matter of any of Examples 12-20, and further including blocking, on the platform router, network access to the local component of the computing device from a device external to the computing device.

Example 22 includes the subject matter of any of Examples 12-21, and wherein the network address includes an Internet Protocol address; and wherein the name resolution request includes a Domain Name Resolution request.

Example 23 includes a computing device to communicate with local components of the computing device, the computing device includes a processor; and a memory having stored therein a plurality of instructions that when executed by the processor cause the computing device to perform the method of any of Examples 12-22.

Example 24 includes one or more machine readable media including a plurality of instructions stored thereon that in response to being executed result in a computing device performing the method of any of Examples 12-22.

Example 25 includes a computing device to communicate with local components of the computing device, the computing device includes means for intercepting a name resolution request from a host application executing on the computing device, the name resolution request includes a hostname of a target destination of a network packet; means for resolving the hostname to obtain a network address assigned to the target destination of the network packet; means for transmitting a response to the name resolution request to the host application, the response includes the network address assigned to the target destination of the network packet; means for receiving the network packet from the host application destined for the network address assigned to the target destination of the network packet; means for determining whether the target destination of the network packet includes a local component of the computing device as a function of the network address assigned to the target destination of the network packet; and means for transmitting the network packet to the local component of the computing device via a platform network in response to determining that the target destination of the network packet includes the local component of the computing device.

Example 26 includes the subject matter of Example 25, and further including means for forwarding the network packet to a device external to the computing device via an external network in response to determining that the target destination of the network packet does not include the local component of the computing device.

Example 27 includes the subject matter of any of Examples 25 and 26, and further including means for receiving a response network packet from the local component of the computing device; and means for transmitting the response network packet to the host application executing on the computing device.

Example 28 includes the subject matter of any of Examples 25-27, and further including means for determining whether the local component of the computing device supports receiving the network packet via the platform network in response to determining that the target destination of the network packet includes the local component of the computing device; means for translating the network packet into a message format supported by the local component in response to determining that the local component does not support receiving the network packet via the platform network; and wherein the means for transmitting the network packet to the local component of the computing device includes (i) means for transmitting the translated network packet to the local component in the supported message format in response to determining that the local component does not support receiving the network packet via the platform network, or (ii) means for transmitting the network packet to the local component via the platform network without translation in response to determining that the local component supports receiving the network packet via the platform network.

Example 29 includes the subject matter of any of Examples 25-28, and further including means for receiving a response message from the local component in response to the translated network packet transmitted to the local component, wherein the response message is in the message format supported by the local component; means for translating the response message into a response network packet; and means for transmitting the response network packet to the host application executing on the computing device via the platform network.

Example 30 includes the subject matter of any of Examples 25-29, and further including means for receiving an address request from the local component of the computing device requesting assignment of the network address; and means for assigning the network address to the local component of the computing device.

Example 31 includes the subject matter of any of Examples 25-30, and, wherein the means for assigning the network address to the local component of the computing device includes means for assigning at least one of a private network address or a public network address to the local component of the computing device.

Example 32 includes the subject matter of any of Examples 25-31, and wherein the means for assigning the network address to the local component of the computing device includes means for assigning a private network address to the local component of the computing device; and wherein the computing device further includes means for translating between the private network address assigned to the local component of the computing device and a public network address assigned to the computing device.

Example 33 includes the subject matter of any of Examples 25-32, and further including means for receiving a name registration request from the local component of the computing device requesting registration of the assigned network address; and means for updating a network address record corresponding to the local component of the computing device with the assigned network address, wherein the network address record corresponding to the local component associates the assigned network address with the hostname of the local component.

Example 34 includes the subject matter of any of Examples 25-33, and further including means for blocking network access to the local component of the computing device from a device external to the computing device.

Example 35 includes the subject matter of any of Examples 25-34, and wherein the network address includes an Internet Protocol address; and wherein the name resolution request includes a Domain Name Resolution request.

Example 36 includes a computing device to facilitate communications between local components of the computing device, the computing device includes a filtering module to intercept a name resolution request from a first local component of the computing device, the name resolution request includes a hostname of a target destination of a network packet; a name resolution module to (i) resolve the hostname to obtain a network address assigned to the target destination of the network packet, and (ii) transmit a response to the name resolution request to the first local component, the response includes the network address assigned to the target destination of the network packet; and the filtering module is further to (i) receive the network packet from the first local component destined for the network address assigned to the target destination of the network packet; (ii) determine whether the target destination of the network packet includes a second local component of the computing device as a function of the network address assigned to the target destination of the network packet; and (iii) transmit the network packet to the second local component of the computing device via a platform network in response to a determination that the target destination of the network packet includes the second local component of the computing device.

Example 37 includes the subject matter of Example 36, and wherein the filtering module is further to forward the network packet to a device external to the computing device via an external network in response to the determination that the target destination of the network packet does not include the second local component of the computing device.

Example 38 includes the subject matter of any of Examples 36 and 37, and wherein the filtering module is further to (i) receive a response network packet from the second local component of the computing device; and (ii) transmit the response network packet to the first local component.

Example 39 includes the subject matter of any of Examples 36-38, and wherein the filtering module is further to (i) determine whether the second local component of the computing device supports receipt of the network packet via the platform network in response to a determination that the target destination of the network packet includes the second local component of the computing device; and (ii) translate the network packet into a message format supported by the second local component in response to a determination that the second local component does not support receipt of the network packet via the platform network; and wherein to transmit the network packet to the second local component of the computing device includes to (i) transmit the translated network packet to the second local component in the supported message format in response to a determination that the second local component does not support receipt of the network packet via the platform network or (ii) transmit the network packet to the second local component via the platform network without translation in response to a determination that the second local component supports receipt of the network packet via the platform network.

Example 40 includes the subject matter of any of Examples 36-39, and wherein the filtering module is further to (i) receive a response message from the second local component in response to the translated network packet transmitted to the second local component, wherein the response message is in the message format supported by the second local component; (ii) translate the response message into a response network packet; and (iii) transmit the response network packet to the first local component of the computing device via the platform network.

Example 41 includes the subject matter of any of Examples 36-40, and further including an address assignment module to (i) receive an address request from the second local component of the computing device for assignment of the network address; and (ii) assign the network address to the second local component of the computing device.

Example 42 includes the subject matter of any of Examples 36-41, and, wherein to assign the network address to the second local component of the computing device includes to assign at least one of a private network address or a public network address to the second local component of the computing device.

Example 43 includes the subject matter of any of Examples 36-42, and wherein to assign the network address to the second local component of the computing device includes to assign a private network address to the second local component of the computing device; and wherein the computing device further includes an interface translation module to translate between the private network address assigned to the second local component of the computing device and a public network address assigned to the computing device.

Example 44 includes the subject matter of any of Examples 36-43, and wherein the name resolution module is further to (i) receive a name registration request from the second local component of the computing device for registration of the assigned network address; and (ii) update a network address record for the second local component of the computing device with the assigned network address, wherein the network address record for the second local component associates the assigned network address with the hostname of the second local component.

Example 45 includes the subject matter of any of Examples 36-44, and further including a firewall module to block network access to at least one of the first local component or the second local component of the computing device from a device external to the computing device.

Example 46 includes the subject matter of any of Examples 36-45, and wherein the network address includes an Internet Protocol address; and wherein the name resolution request includes a Domain Name Resolution request.

Example 47 includes a method for facilitating communications between local components of a computing device, the method includes intercepting, on a platform router of a computing device, a name resolution request from a first local component of the computing device, the name resolution request includes a hostname of a target destination of a network packet; resolving, on the platform router, the hostname to obtain a network address assigned to the target destination of the network packet; transmitting, on the platform router, a response to the name resolution request to the first local component, the response includes the network address assigned to the target destination of the network packet; receiving, on the platform router, the network packet from the first local component destined for the network address assigned to the target destination of the network packet; determining, on the platform router, whether the target destination of the network packet includes a second local component of the computing device as a function of the network address assigned to the target destination of the network packet; and transmitting, on the platform router, the network packet to the second local component of the computing device via a platform network in response to determining that the target destination of the network packet includes the second local component of the computing device.

Example 48 includes the subject matter of Example 47, and further including forwarding, on the platform router, the network packet to a device external to the computing device via an external network in response to determining that the target destination of the network packet does not include the second local component of the computing device.

Example 49 includes the subject matter of any of Example 47 and 48, and further including receiving, on the platform router, a response network packet from the second local component of the computing device; and transmitting, on the platform router, the response network packet to the first local component.

Example 50 includes the subject matter of any of Example 47-49, and further including g determining, on the platform router, whether the second local component of the computing device supports receipt of the network packet via the platform network in response to determining that the target destination of the network packet includes the second local component of the computing device; translating, on the platform router, the network packet into a message format supported by the second local component in response to determining that the second local component does not support receipt of the network packet via the platform network; and wherein to transmitting the network packet to the second local component of the computing device includes (i) transmitting the translated network packet to the second local component in the supported message format in response to determining that the second local component does not support receipt of the network packet via the platform network or (ii) transmitting the network packet to the second local component via the platform network without translation in response to determining that the second local component supports receipt of the network packet via the platform network.

Example 51 includes the subject matter of any of Example 47-50, and further including receiving, on the platform router, a response message from the second local component in response to the translated network packet transmitted to the second local component, wherein the response message is in the message format supported by the second local component; translating, on the platform router, the response message into a response network packet; and transmitting, on the platform router, the response network packet to the first local component of the computing device via the platform network.

Example 52 includes the subject matter of any of Example 47-51, and further including receiving, on the platform router, an address request from the second local component of the computing device for assignment of the network address; and assigning, on the platform router, the network address to the second local component of the computing device.

Example 53 includes the subject matter of any of Example 47-52, and wherein assigning the network address to the second local component of the computing device includes assigning at least one of a private network address or a public network address to the second local component of the computing device.

Example 54 includes the subject matter of any of Example 47-53, and wherein assigning the network address to the second local component of the computing device includes assigning a private network address to the second local component of the computing device; and wherein the method further includes translating, on the platform router, between the private network address assigned to the second local component of the computing device and a public network address assigned to the computing device.

Example 55 includes the subject matter of any of Example 47-54, and further including receiving, on the platform router, a name registration request from the second local component of the computing device for registration of the assigned network address; and updating, on the platform router, a network address record for the second local component of the computing device with the assigned network address, wherein the network address record for the second local component associates the assigned network address with the hostname of the second local component.

Example 56 includes the subject matter of any of Example 47-55, and further including blocking, on the platform router, network access to at least one of the first local component or the second local component of the computing device from a device external to the computing device.

Example 57 includes the subject matter of any of Example 47-56, and wherein the network address includes an Internet Protocol address; and wherein the name resolution request includes a Domain Name Resolution request.

Example 58 includes a computing device to facilitate communications between local components of the computing device, the computing device includes a processor; and a memory having stored therein a plurality of instructions that when executed by the processor cause the computing device to perform the method of any of Examples 47-57.

Example 59 includes one or more machine readable media includes a plurality of instructions stored thereon that in response to being executed result in a computing device performing the method of any Examples 47-57.

The invention claimed is:

1. A computing device to facilitate communications between local components of the computing device, the computing device comprising:
   one or more processors; and
   one or more memory devices having stored therein a plurality of instructions that, when executed by the one or more processors, cause the computing device to:
   intercept, by a platform router of the computing device, a name resolution request from a first local component of the computing device, the name resolution request comprising a hostname of a target destination of a network packet;
   resolve, by the platform router, the hostname to obtain a network address assigned to the target destination of the network packet;
   transmit, by the platform router, a response to the name resolution request to the first local component, the response comprising the network address assigned to the target destination of the network packet; and
   receive, by the platform router, the network packet from the first local component destined for the network address assigned to the target destination of the network packet;
   determine, by the platform router, whether the target destination of the network packet comprises a second local component of the computing device as a function of the network address assigned to the target destination of the network packet;
   determine, by the platform router, whether the second local component of the computing device supports receipt of the network packet via the platform network in response to a determination that the target destination of the network packet comprises the second local component of the computing device;
   translate, by the platform router, the network packet into a message format supported by the second local component in response to a determination that the second local component does not support receipt of the network packet via the platform network; and
   transmit, by the platform router and in response to a determination that the target destination of the network packet comprises the second local component of the computing device, (i) the translated network packet to the second local component in the supported message format in response to a determination that the second local component does not support receipt of the network packet via the platform network or (ii) the network packet to the second local component via the platform network without translation in response to a determination that the second local component supports receipt of the network packet via the platform network.

2. The computing device of claim 1, wherein the plurality of instructions, when executed, further cause the computing device to forward the network packet to a device external to the computing device via an external network in response to the determination that the target destination of the network packet does not comprise the second local component of the computing device.

3. The computing device of claim 1, wherein the plurality of instructions, when executed, further cause the computing device to (i) receive a response network packet from the second local component of the computing device; and (ii) transmit the response network packet to the first local component.

4. The computing device of claim 1, wherein the plurality of instructions, when executed, further cause the computing device to (i) receive a response message from the second local component in response to the translated network packet transmitted to the second local component, wherein the response message is in the message format supported by the second local component; (ii) translate the response message into a response network packet; and (iii) transmit the response network packet to the first local component of the computing device via the platform network.

5. The computing device of claim 1, wherein the plurality of instructions, when executed, further cause the computing device to (i) receive an address request from the second local component of the computing device for assignment of the network address; and (ii) assign the network address to the second local component of the computing device.

6. The computing device of claim 5, wherein to assign the network address to the second local component of the computing device comprises to assign at least one of a private network address or a public network address to the second local component of the computing device.

7. The computing device of claim 5, wherein to assign the network address to the second local component of the computing device comprises to assign a private network address to the second local component of the computing device; and
wherein the plurality of instructions, when executed, further cause the computing device to translate between the private network address assigned to the second local component of the computing device and a public network address assigned to the computing device.

8. The computing device of claim 5, wherein the plurality of instructions, when executed, further cause the computing device to (i) receive a name registration request from the second local component of the computing device for registration of the assigned network address; and (ii) update a network address record for the second local component of the computing device with the assigned network address, wherein the network address record for the second local component associates the assigned network address with the hostname of the second local component.

9. The computing device of any of claims 1, wherein the plurality of instructions, when executed, further cause the computing device to block network access to at least one of the first local component or the second local component of the computing device from a device external to the computing device.

10. The computing device of claim 1, wherein the network address comprises an Internet Protocol address; and
wherein the name resolution request comprises a Domain Name Resolution request.

11. A method for facilitating communications between local components of a computing device, the method comprising:
intercepting, by a platform router of a computing device, a name resolution request from a first local component of the computing device, the name resolution request comprising a hostname of a target destination of a network packet;
resolving, by the platform router, the hostname to obtain a network address assigned to the target destination of the network packet;
transmitting, by the platform router, a response to the name resolution request to the first local component, the response comprising the network address assigned to the target destination of the network packet;
receiving, by the platform router, the network packet from the first local component destined for the network address assigned to the target destination of the network packet;
determining, by the platform router, whether the target destination of the network packet comprises a second local component of the computing device as a function of the network address assigned to the target destination of the network packet;
determining, by the platform router, whether the second local component of the computing device supports receipt of the network packet via the platform network in response to a determination that the target destination of the network packet comprises the second local component of the computing device;
translating, by the platform router, the network packet into a message format supported by the second local component in response to a determination that the second local component does not support receipt of the network packet via the platform network; and
transmitting, by the platform router and in response to determining that the target destination of the network packet comprises the second local component of the computing device, (i) the translated network packet to the second local component in the supported message format in response to a determination that the second local component does not support receipt of the network packet via the platform network or (ii) the network packet to the second local component via the platform network without translation in response to a determination that the second local component supports receipt of the network packet via the platform network.

12. The method of claim 11, further comprising forwarding, by the platform router, the network packet to a device external to the computing device via an external network in response to determining that the target destination of the network packet does not comprise the second local component of the computing device.

13. The method of claim 11, further comprising:
receiving, by the platform router, a response network packet from the second local component of the computing device; and
transmitting, by the platform router, the response network packet to the first local component.

14. The method of claim 11, further comprising:
receiving, by the platform router, a response message from the second local component in response to the translated network packet transmitted to the second local component, wherein the response message is in the message format supported by the second local component; translating, by the platform router, the response message into a response network packet; and transmitting, by the platform router, the response network packet to the first local component of the computing device via the platform network.

15. The method of claim 11, further comprising receiving, by the platform router, an address request from the second local component of the computing device for assignment of the network address; and
assigning, by the platform router, the network address to the second local component of the computing device.

16. The method of claim 15, wherein assigning the network address to the second local component of the computing device comprises assigning at least one of a private network address or a public network address to the second local component of the computing device.

17. The method of claim 15, wherein assigning the network address to the second local component of the computing device comprises assigning a private network address to the second local component of the computing device; and
wherein the method further comprises translating, by the platform router, between the private network address assigned to the second local component of the computing device and a public network address assigned to the computing device.

18. The method of claim 15, further comprising:
receiving, by the platform router, a name registration request from the second local component of the computing device for registration of the assigned network address; and
updating, by the platform router, a network address record for the second local component of the computing device with the assigned network address, wherein the network address record for the second local component associates the assigned network address with the hostname of the second local component.

19. The method of claim 11, further comprising blocking, by the platform router, network access to at least one of the first local component or the second local component of the computing device from a device external to the computing device.

20. One or more non-transitory, machine readable media comprising a plurality of instructions stored thereon that, when executed, cause a computing device to:
intercept, by a platform router of the computing device, a name resolution request from a first local component of the computing device, the name resolution request comprising a hostname of a target destination of a network packet;
resolve, by the platform router, the hostname to obtain a network address assigned to the target destination of the network packet;
transmit, by the platform router, a response to the name resolution request to the first local component, the response comprising the network address assigned to the target destination of the network packet;
receive, by the platform router, the network packet from the first local component destined for the network address assigned to the target destination of the network packet;
determine, by the platform router, whether the target destination of the network packet comprises a second local component of the computing device as a function of the network address assigned to the target destination of the network packet;
determine, by the platform router, whether the second local component of the computing device supports receipt of the network packet via the platform network in response to a determination that the target destination of the network packet comprises the second local component of the computing device;
translate, by the platform router, the network packet into a message format supported by the second local component in response to a determination that the second local component does not support receipt of the network packet via the platform network; and
transmit, by the platform router and in response to a determination that the target destination of the network packet comprises the second local component of the computing device, (i) the translated network packet to the second local component in the supported message format in response to a determination that the second local component does not support receipt of the network packet via the platform network or (ii) the network packet to the second local component via the platform network without translation in response to a determination that the second local component supports receipt of the network packet via the platform network.

21. The one or more non-transitory, machine readable media of claim 20, wherein the plurality of instructions, when executed, further cause the compute device to forward the network packet to a device external to the computing device via an external network in response to determining that the target destination of the network packet does not comprise the second local component of the computing device.

22. The one or more non-transitory, machine readable media of claim 20, wherein the plurality of instructions, when executed, further cause the compute device to:
receive a response network packet from the second local component of the computing device; and
transmit the response network packet to the first local component.

23. The one or more non-transitory, machine readable media of claim 20, wherein the plurality of instructions, when executed, further cause the compute device to: receive a response message from the second local component in response to the translated network packet transmitted to the second local component, wherein the response message is in the message format supported by the second local component; translate the response message into a response network packet; and transmit the response network packet to the first local component of the computing device via the platform network.

24. The one or more non-transitory, machine readable media of claim 20, wherein the plurality of instructions, when executed, further cause the compute device to receive an address request from the second local component of the computing device for assignment of the network address; and
assign the network address to the second local component of the computing device.

25. The one or more non-transitory, machine readable media of claim 24, wherein to assign the network address to the second local component of the computing device comprises to assign at least one of a private network address or a public network address to the second local component of the computing device.

26. The one or more non-transitory, machine readable media of claim 24, wherein to assign the network address to the second local component of the computing device comprises to assign a private network address to the second local component of the computing device; and wherein the plurality of instructions, when executed, further cause the compute device to translate between the private network address assigned to the second local component of the computing device and a public network address assigned to the computing device.

27. The one or more non-transitory, machine readable media of claim 24, wherein the plurality of instructions, when executed, further cause the compute device to:

receive a name registration request from the second local component of the computing device for registration of the assigned network address; and update a network address record for the second local component of the computing device with the assigned network address, wherein the network address record for the second local component associates the assigned network address with the hostname of the second local component.

28. The one or more non-transitory, machine readable media of claim 20, wherein the plurality of instructions, when executed, further cause the compute device to block network access to at least one of the first local component or the second local component of the computing device from a device external to the computing device.

\* \* \* \* \*